Nov. 18, 1941.　　T. E. VESELY　　2,262,978
SURFACE CLEANING MACHINE
Filed Dec. 10, 1940　　4 Sheets-Sheet 1
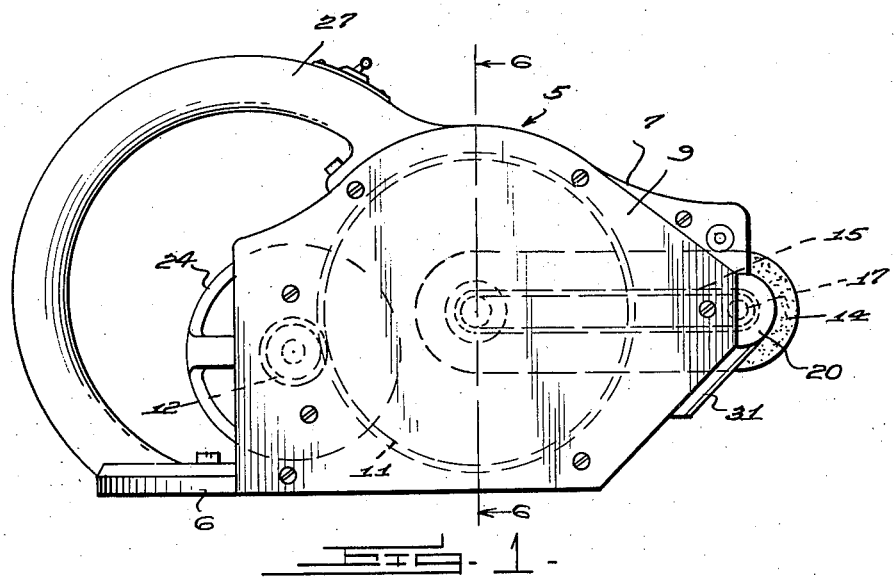
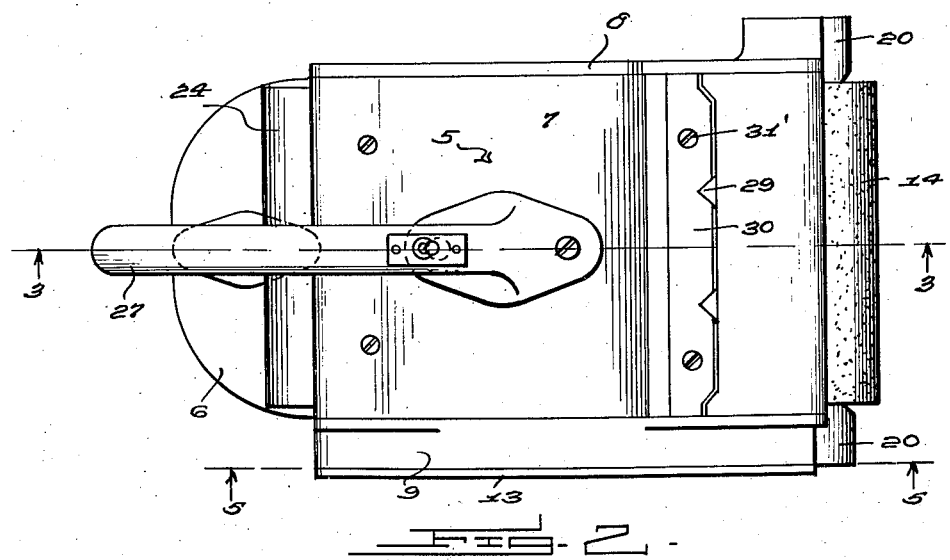
Inventor
THOMAS E. VESELY,
By *Clarence A. O'Brien and Hyman Berman*
Attorneys

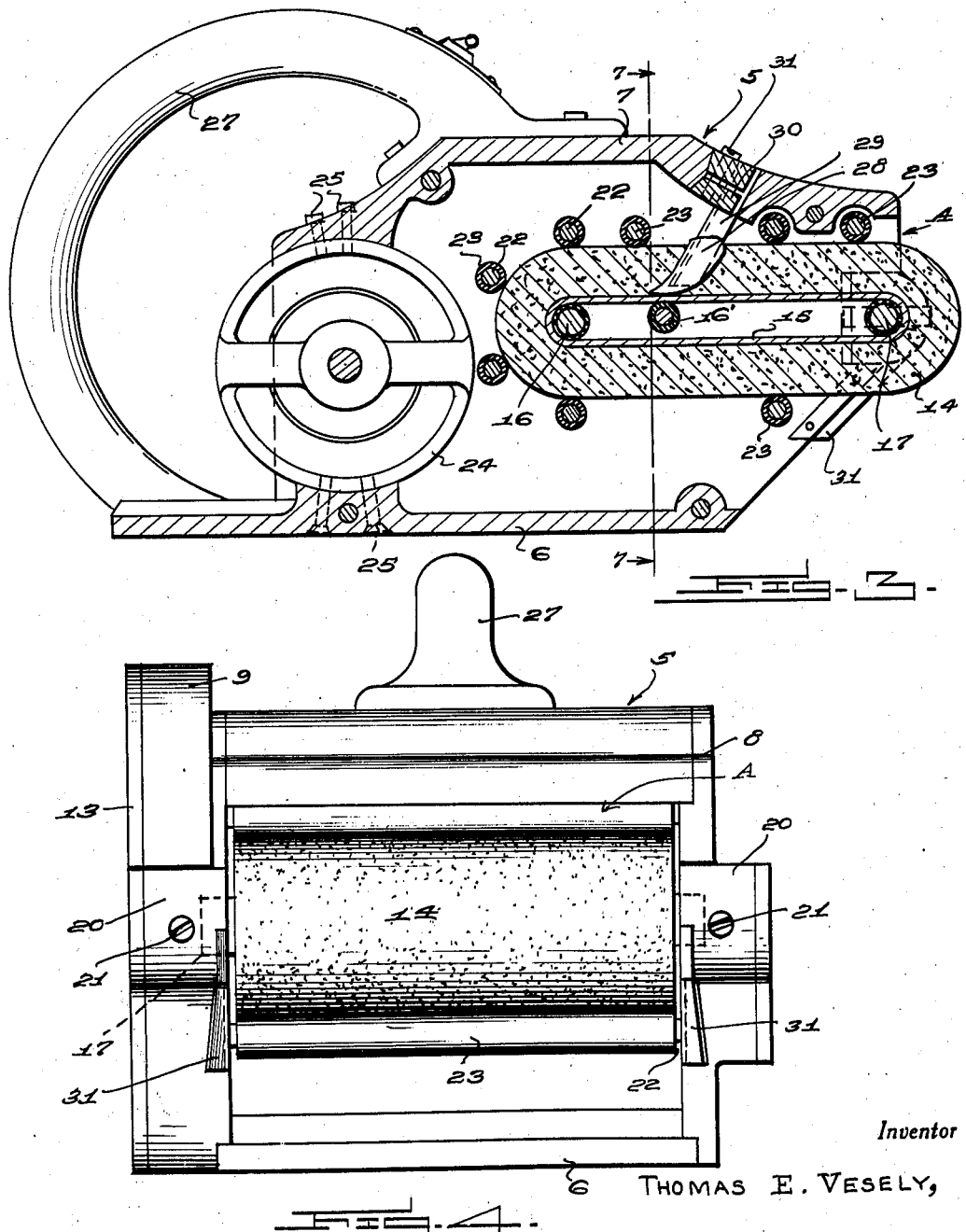

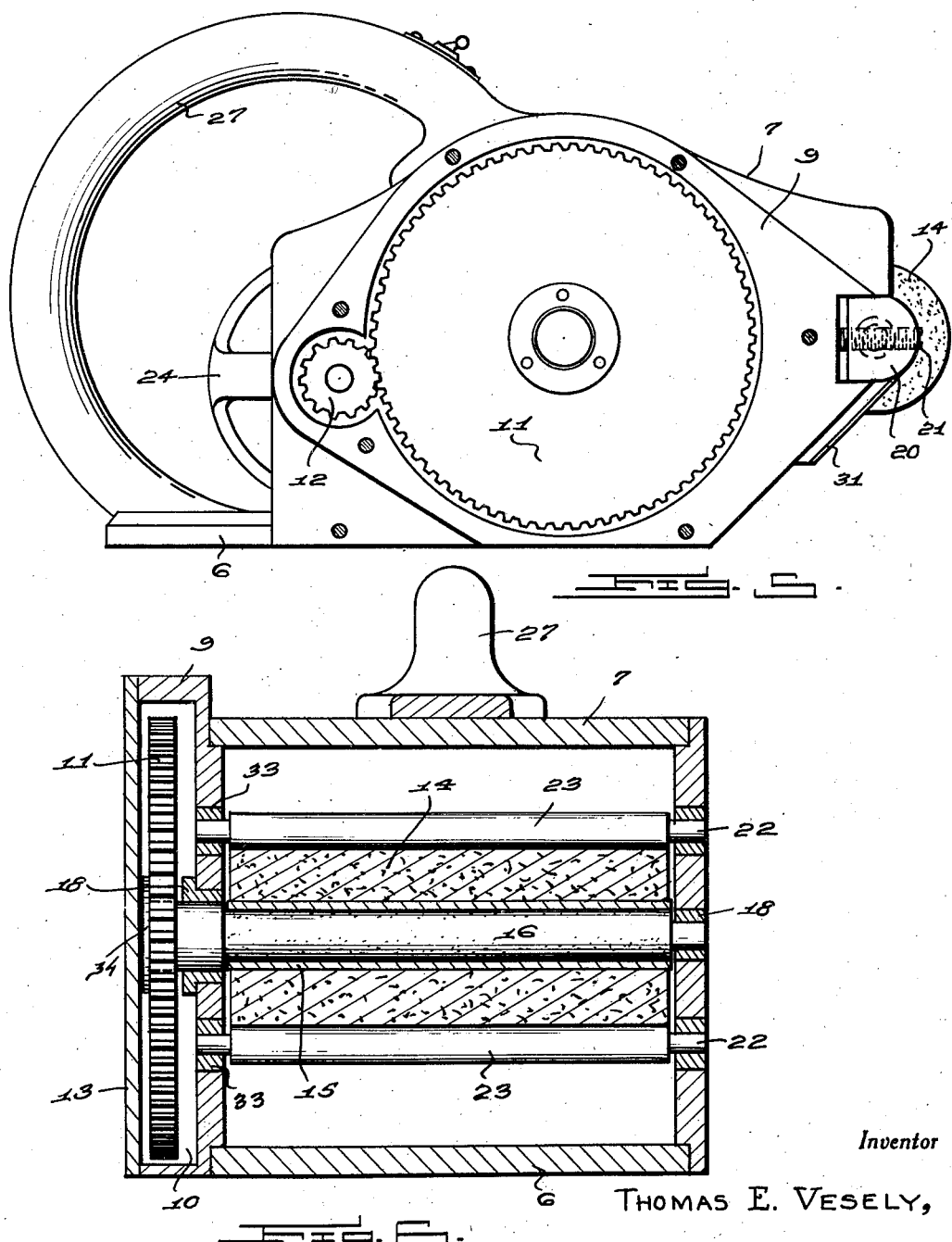

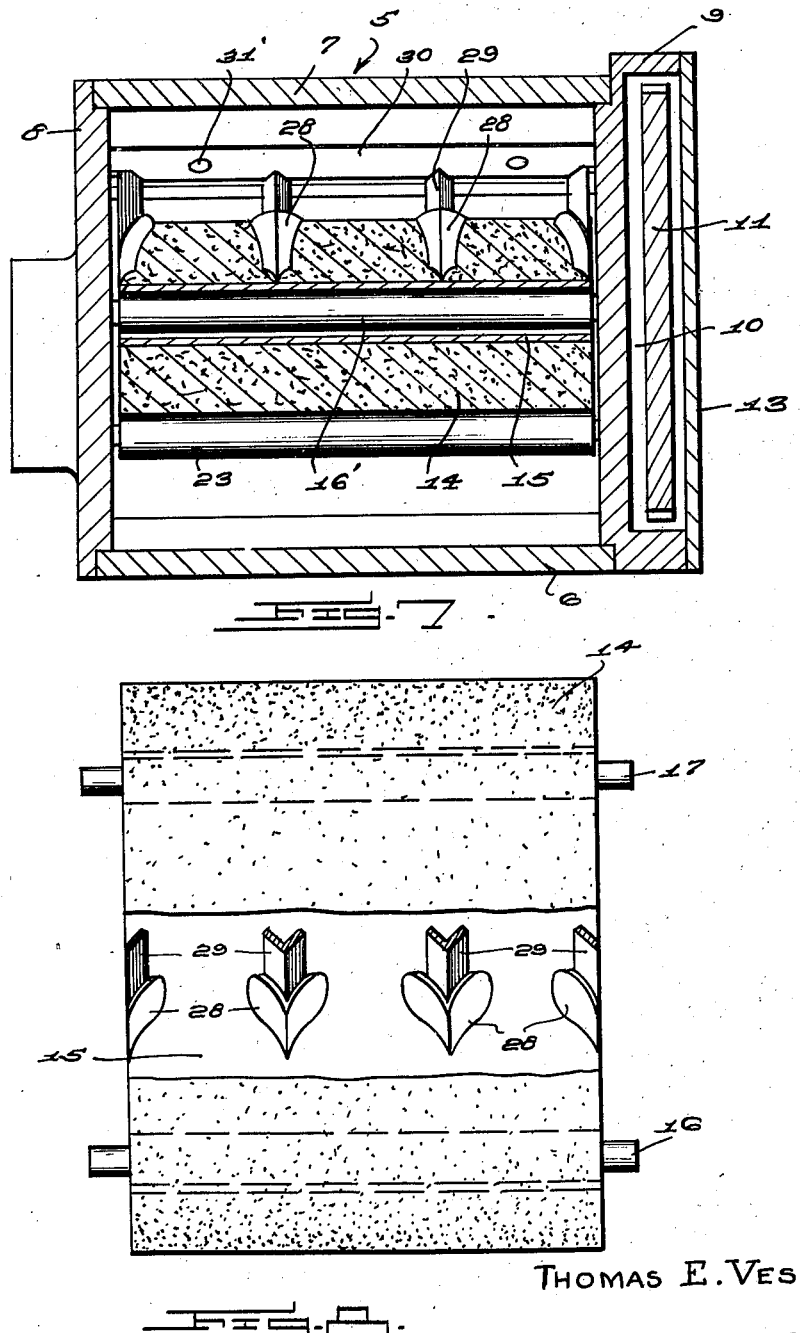

Patented Nov. 18, 1941

2,262,978

UNITED STATES PATENT OFFICE 2,262,978

SURFACE CLEANING MACHINE

Thomas E. Vesely, Crown Point, Ind.

Application December 10, 1940, Serial No. 369,496

5 Claims. (Cl. 15—99)

This invention relates to a power driven machine for cleaning paper surfaces, and has for the primary object the provision of a portable device of this character which will be easy to operate and will efficiently clean a surface of foreign matter within a comparatively short period of time and includes a suitable housing supporting an endless power driven belt carrying a cleaning material which may be readily brought into contact with the surface to remove therefrom foreign matter and has means for mixing the cleaning material while on the belt and also means for pressing said cleaning material onto the belt during its travel with said belt.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a portable power driven surface cleaning machine constructed in accordance with my invention.

Figure 2 is a top plan view illustrating the device.

Figure 3 is a sectional view taken on the line 3—3 of Figure 2.

Figure 4 is an end view showing the device with the cleaning material exposed for contact with a surface.

Figure 5 is a sectional view taken on the line 5—5 of Figure 2.

Figure 6 is a sectional view taken on the line 6—6 of Figure 1.

Figure 7 is a sectional view taken on the line 7—7 of Figure 3.

Figure 8 is a diagrammatical view showing the cleaning material supported by the endless belt and mixed by the movement thereof relative to a series of agitating elements or plows.

Referring in detail to the drawings, the numeral 5 indicates a housing which is of a shape to permit easy and convenient handling thereof and includes a base plate 6, a top wall 7 and side walls 8 and 9. The side wall 9 is chambered to form a gear casing 10 in which operate gears 11 and 12. The side wall 9 further includes a removable cover plate 13 so that the gears may be readily assembled within the gear casing and further to permit the assembling of a series of shafts within the casing and which will be hereinafter more fully described. The opposite ends of the housing are open and one of said ends is adapted to be brought adjacent the surface to be cleaned when the device is in operation and this end is indicated by the character A having a portion thereof cut on an angle of approximately 45 degrees, as clearly shown in Figure 3, for the purpose of exposing cleaning material 14 carried by an endless belt 15. The cleaning material is for the removal of foreign matter or dirt from painted or papered surfaces and is a commercial product made by several manufacturers and supplied to the trade through paint and hardware stores and consists of a mass which should during its use receive a mixing or action as well as being pressed into a desired form or shape and thereby made to maintain its position on the endless belt 15 during a cleaning operation. The cleaning material as before stated is well known in this art and forms no part of the present invention except for its use as a cleansing or cleaning agent. The endless belt 15 is supported by rubber covered shafts 16 and 17. The shaft 16 is mounted in bearings 18 carried by the side walls, one of which is slightly larger than the other for the purpose of accommodating an enlarged portion of the shaft 16 on which is secured the gear 11. The shaft 17 is supported by bearing blocks 20 slidably mounted in the opposite side walls and held in various adjusted positions by set screws 21 for the purpose of placing a desired tension on the endless belt.

Pressing rollers 22 are arranged above and below the endless belt and at one end thereof, as clearly shown in Figure 3, and have contact with the cleaning material for placing pressure thereon to maintain the cleaning material in a mass upon the endless belt for movement therewith so that as the cleaning material moves outwardly of the end A of the housing it may be brought in contact with the surface to be cleaned and thereby remove the foreign matter on the surface. It is preferable that the pressing rollers 22 be equipped with rubber coverings 23 which contact the cleaning material during the travel of the endless belt.

In order that the endless belt 15 be power driven, an electric motor 24 is removably mounted in the housing by set screws 25, the latter being carried by the base plate and the top plate 7 of the housing. The shaft of the motor has the gear 12 secured thereto and the gear 12 being in mesh with the gear 11 the shaft 16 is driven by the electric motor and thereby imparts motion to the endless belt 15.

In order that the device may be conveniently handled and the cleaning material brought into contact with the surface, an arcuately curved handle 27 has its ends secured to the top plate 7 and the base plate 6.

The cleaning material during its use must be mixed or agitated and in order that this may be carried out a series of agitating elements or plows 28 engage with the mixing material as it travels with the upper run of the belt and are carried by shanks 29 secured on the housing by a clamping plate 30, the latter being held in place by set screws 31'.

It will be seen from Figure 3 that the cleaning material 14 prior and after being agitated or mixed by the plows will receive a pressing force from the pressing rollers so that the cleaning material will be kept in a proper mass for efficient work upon the surface to be cleaned as it moves outwardly at the end A of the housing by the endless belt. As this cleaning material contacts the surface being cleaned it has a tendency to spread and to prevent the cleaning material from being torn from the endless belt when reentering the housing, the bearing blocks 20 have beveled faces and also carried by the housing and coacting with the beveled faces are flanged plates 31 set at an angle of approximately 45 degrees, as shown in Figure 3, to contact whatever cleaning material which may be forced out of shape back onto the belt for movement into the housing with said belt.

The pressing rollers 22 are carried by bearings 33 located in the side plates of the housing.

Arranged to engage with the upper run of the endless belt 15 directly under the plows is an idler shaft 16' for the purpose of supporting the belt when the plows are acting on the cleaning material 14. The idler shaft 16' is journaled in the side walls 8 and 9 of the housing.

A wear plate 34 is removably secured on the cover plate 13 to contact the hub portion of the gear 11 to prevent any wear occurring on the cover plate 13.

It is believed that the foregoing description, when taken in connection with the drawings will fully set forth the construction and advantages of this invention to those skilled in the art to which such a device relates, so that further detailed description will not be required.

Having thus described my invention, what I claim is:

1. A surface cleaning machine comprising a portable housing, an endless belt mounted in said housing and movable outwardly thereof at one end of the housing, power means for operating said belt carried by the housing, a cleaning material of a doughy consistency supported by the belt, pressing means engaging the cleaning material during its travel with the belt to maintain said cleaning material in a mass on the belt and carried by the housing.

2. A surface cleaning machine comprising a portable housing, an endless belt mounted in said housing and movable outwardly thereof at one end of the housing, power means for operating said belt carried by the housing, a cleaning material of a doughy consistency supported by the belt, pressing means engaging the cleaning material during its travel with the belt to maintain said cleaning material in a mass on the belt and carried by the housing, and means carried by the housing to agitate the cleaning material.

3. In a device of the character set forth, a housing, a handle on said housing, an endless belt mounted in said housing for movement outwardly thereof at one end of the housing, a cleaning material of a doughy consistency located on said belt and movable therewith, pressing rollers carried by said housing to contact the cleaning material during its movement with the endless belt, an electric motor carried by the housing, drive means between the electric motor and the endless belt, and agitating elements carried by said housing to engage with the cleaning material to mix the same during its movement with the belt prior to moving outwardly of the housing.

4. In a device of the character set forth, a housing, a handle for said housing, a drive shaft journaled in said housing, a shaft adjustably mounted in said housing and located at one end thereof, an endless belt supported by said shaft, a power means carried by said housing, gearing connecting said power means to said drive shaft, a cleaning material of doughy consistency supported by the belt and movable therewith, pressing rollers carried by said housing and including yieldable coverings to contact the cleaning material.

5. In a device of the character set forth, a housing, a handle for said housing, a drive shaft journaled in said housing, a shaft adjustably mounted in said housing and located at one end thereof, an endless belt supported by said shaft, a power means carried by said housing, gearing connecting said power means to said drive shaft, a cleaning material of doughy consistency supported by the belt and movable therewith, pressing rollers carried by said housing and including yieldable coverings to contact the cleaning material, and means carried by said housing to engage and reshape the cleaning material as the latter contacts and moves from a surface.

THOMAS E. VESELY.